(12) United States Patent
Tolmatsky et al.

(10) Patent No.: US 11,613,999 B2
(45) Date of Patent: Mar. 28, 2023

(54) SYSTEM AND METHOD FOR DETECTING DETERIORATION OF A CONTROL VALVE

(71) Applicant: Compressor Controls Corporation, Des Moines, IA (US)

(72) Inventors: Michael Lev Tolmatsky, Des Moines, IA (US); Serge Staroselsky, Des Moines, IA (US); Paul Marvin Negley, Urbandale, IA (US); John Tse, West Des Moines, IA (US)

(73) Assignee: Compressor Controls LLC, Des Moines, IA (US)

( * ) Notice: Subject to any disclaimer, the term of this patent is extended or adjusted under 35 U.S.C. 154(b) by 745 days.

(21) Appl. No.: 16/605,623

(22) PCT Filed: Apr. 18, 2018

(86) PCT No.: PCT/US2018/028129
§ 371 (c)(1),
(2) Date: Oct. 16, 2019

(87) PCT Pub. No.: WO2018/195173
PCT Pub. Date: Oct. 25, 2018

(65) Prior Publication Data
US 2020/0131927 A1    Apr. 30, 2020

Related U.S. Application Data

(60) Provisional application No. 62/488,188, filed on Apr. 21, 2017.

(51) Int. Cl.
*G01M 13/003* (2019.01)
*F01D 21/14* (2006.01)
(Continued)

(52) U.S. Cl.
CPC .......... *F01D 21/14* (2013.01); *F16K 37/0041* (2013.01); *F16K 37/0083* (2013.01);
(Continued)

(58) Field of Classification Search
CPC .. F01D 21/14; F16K 37/0041; F16K 37/0083; F16K 37/0091; F16K 37/0025;
(Continued)

(56) References Cited

U.S. PATENT DOCUMENTS 3,488,029 A    1/1970  Durbin
3,972,641 A *  8/1976  Harner .................. F04D 27/023
                                          415/28
(Continued)

OTHER PUBLICATIONS

International Search Report issued in corresponding International Application No. PCT/US2018/028129 dated Jul. 16, 2018, 15 pages.

*Primary Examiner* — Alexander A Mercado
(74) *Attorney, Agent, or Firm* — Snyder, Clark, Lesch & Chung, LLP

(57) ABSTRACT

Automatic testing for control valves is provided for diagnosing of actuators, including actuators not equipped with analog or discrete position transmitters. A valve controller confirms steady-state conditions for a turbo-compressor system that includes a control valve in a first position and sends, to an actuator for the control valve, a signal to initiate a partial valve stroke to move the control valve away from the first position. The valve controller receives feedback signals from sensors in the turbo-compressor system and monitors the feedback signals for a change from the steady-state conditions. When the monitoring detects a change from the steady-state conditions within a defined time period, the valve controller sends, to the actuator, a signal to return the control valve to the first position. When the monitoring does (Continued)

not detect a change from the steady-state conditions within the defined time period, the valve controller generates an alarm signal.

20 Claims, 9 Drawing Sheets

(51) Int. Cl.
*F16K 37/00* (2006.01)
*F04D 27/00* (2006.01)

(52) U.S. Cl.
CPC ....... *F16K 37/0091* (2013.01); *G01M 13/003* (2019.01); *F04D 27/001* (2013.01); *F04D 27/008* (2013.01)

(58) Field of Classification Search
CPC .. F16K 37/005; G01M 13/003; F04D 27/008; F04D 27/0215; F05D 2260/80; G05B 23/00
See application file for complete search history.

(56) References Cited

U.S. PATENT DOCUMENTS

| | | |
|---|---|---|
| 4,002,065 A | 1/1977 | Lardi et al. |
| 4,627,789 A * | 12/1986 | Petro ......................... F02C 9/18 415/28 |
| 4,637,587 A | 1/1987 | Kuhnlein |
| 4,805,515 A | 2/1989 | Kast |
| 5,665,898 A | 9/1997 | Smith et al. |
| 5,687,098 A | 11/1997 | Grumstrup et al. |
| 5,966,679 A | 10/1999 | Snowbarger et al. |
| 6,155,282 A | 12/2000 | Zachary et al. |
| 6,435,202 B2 | 8/2002 | Zachary et al. |
| 6,466,893 B1 | 10/2002 | Latwesen et al. |
| 6,478,048 B2 | 11/2002 | Hays |
| 6,557,400 B2 * | 5/2003 | Xiong ................... F04D 27/001 701/100 |
| 6,722,383 B2 | 4/2004 | Summers et al. |
| 6,862,914 B1 | 3/2005 | Zachary et al. |
| 6,898,542 B2 | 5/2005 | Ott et al. |
| 7,499,761 B2 | 3/2009 | Zachary et al. |
| 8,074,512 B2 | 12/2011 | Al-Buaijan |
| 8,290,631 B2 | 10/2012 | Sweeney et al. |
| 8,662,106 B2 | 3/2014 | Reumschussel et al. |
| 8,794,268 B2 | 8/2014 | Cole |
| 9,557,059 B2 | 1/2017 | Kucera et al. |
| 2002/0139180 A1 * | 10/2002 | Xiong ...................... F02C 9/18 73/112.05 |
| 2008/0238698 A1 * | 10/2008 | Holt .......................... F02C 9/18 340/611 |
| 2011/0040526 A1 | 2/2011 | Blotenberg et al. |
| 2011/0114191 A1 | 5/2011 | Wheater et al. |
| 2013/0104516 A1 * | 5/2013 | Varillas ..................... F02C 9/18 60/39.24 |
| 2013/0153798 A1 | 6/2013 | Kucera et al. |
| 2016/0273676 A1 | 9/2016 | Junk |

* cited by examiner

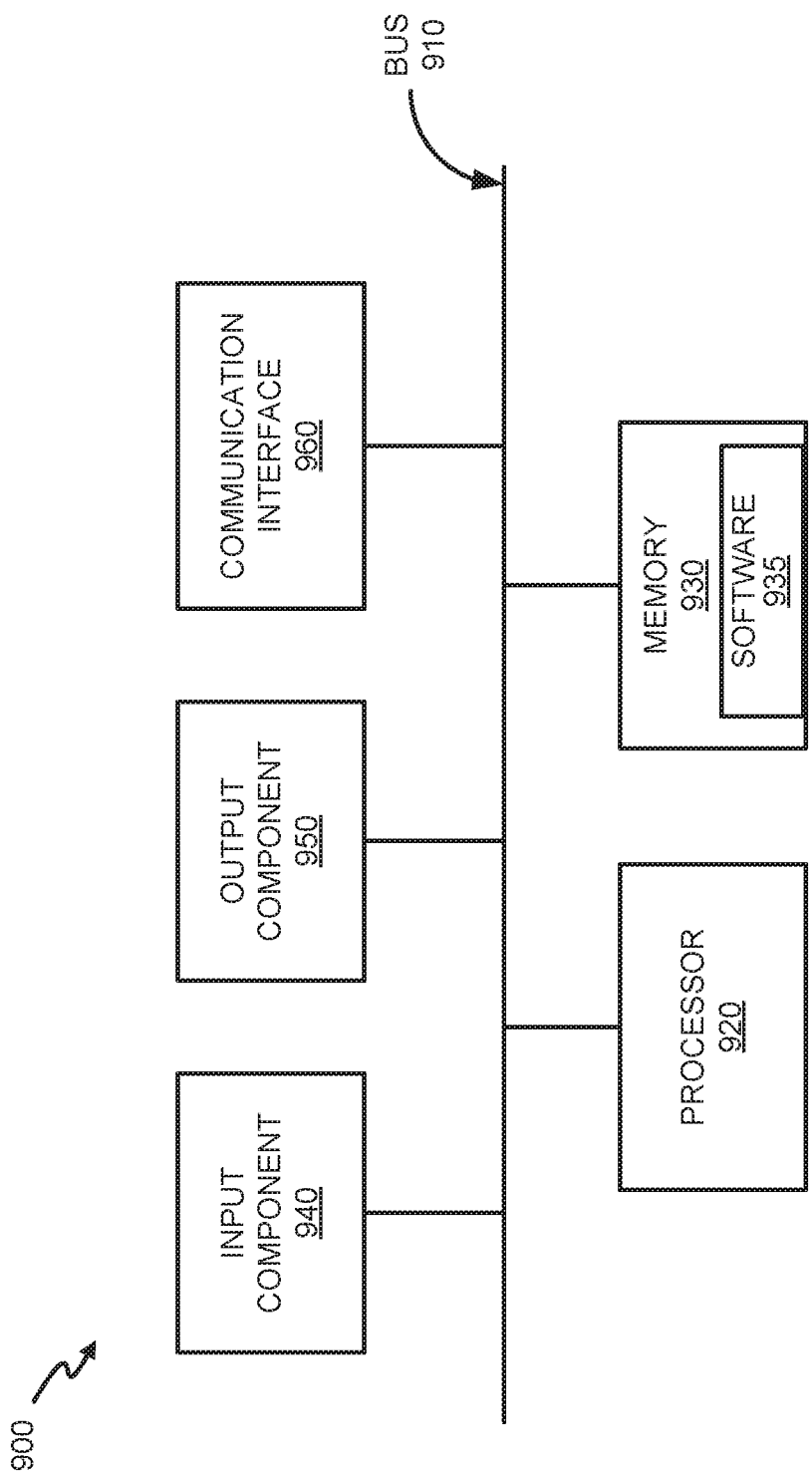

SYSTEM AND METHOD FOR DETECTING DETERIORATION OF A CONTROL VALVE

CROSS-REFERENCE TO RELATED APPLICATIONS

This application claims the benefit under 35 U.S.C. § 371 of International Application No. PCT/US2018/028129, filed Apr. 18, 2018, which claims priority under 35 U.S.C. § 119 based on U.S. Provisional Patent Application No. 62/488, 188, filed Apr. 21, 2017, entitled SYSTEM AND METHOD FOR DETECTING DETERIORATION OF A CONTROL VALVE, the disclosures of which are both hereby incorporated by reference herein.

BACKGROUND OF THE INVENTION

Control valves in turbo-compressor anti-surge and steam turbine applications may often remain in one position for extended periods of time. When it becomes necessary for the valve to move, the valve's response may be severely degraded, or the valve may not even respond at all. This can be due to the buildup of foreign material between the moving and stationary elements of the valve, resulting in increased friction or complete seizure of the valve. In some cases, the valve's actuator may develop a malfunction while operating at a constant position, which is not revealed until a change in position is requested.

BRIEF DESCRIPTION OF THE DRAWINGS

FIG. 9 is a diagram illustrating exemplary components of a valve controller in the system of FIG. 1.

DETAILED DESCRIPTION OF THE PREFERRED EMBODIMENTS

Figure 1:
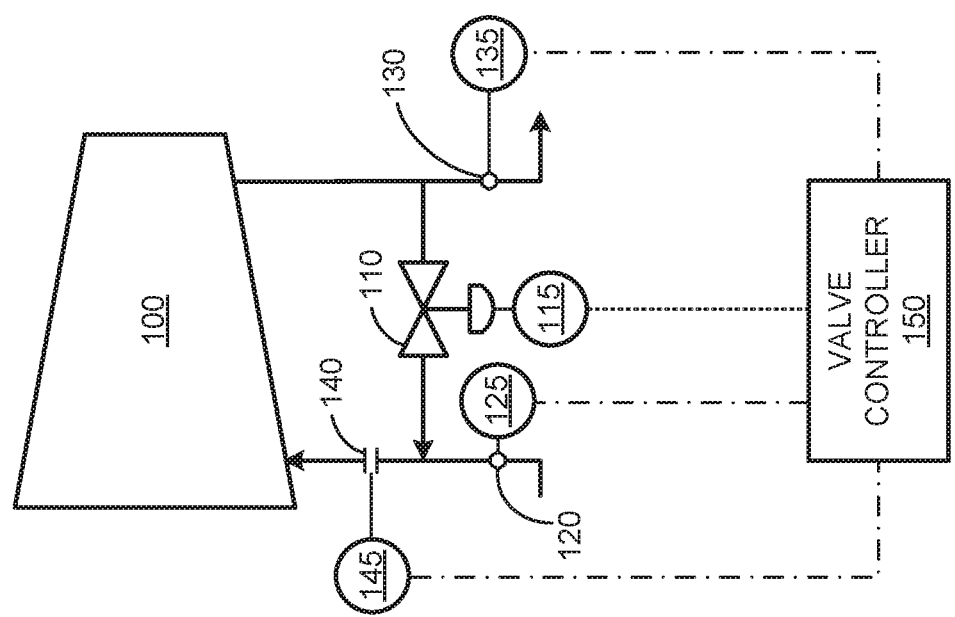
FIG. 1 is a schematic of a system in which systems and methods described herein may be implemented.

The following detailed description refers to the accompanying drawings. The same reference numbers in different drawings may identify the same or similar elements.

Systems and methods described herein relate generally to automatic testing for control valves. More particularly, the systems and methods relate to identifying latent failures and degradation of the actuation of control valves, such as anti-surge control valves and control valves of steam turbines.

Degradation of valves that undergo infrequent cycling may go undetected until a change in valve position is required. Some control systems, such as steam turbine control systems, can provide a high frequency, low amplitude signal (referred to as dithering), which is added to the normal control signal, resulting in small movements of the valve without disturbing the system operations. For anti-surge systems, there are currently no accepted means of diagnosing actuator and valve deterioration during operation except for manually changing the control signal and then evaluating the response. Dithering may prove effective in preventing valve seizure, but does not provide any information on the degradation of the valve or actuator. Manual evaluation is susceptible to human error and can result in process disturbance or even loss of production.

Diagnostics of automatically controlled actuators under load is required for increasing the reliability of an automatic control system. This requirement relates to actuators and the associated valves, which are operating for long periods in the closed or open position. For example, turbo-compressor anti-surge valves are often operated fully closed and turbine valves are often operated fully open. Previously, diagnostic tests were conducted by moving the actuator and then checking for a resulting movement in the actuator position feedback signal. However, some actuators are not equipped with analog or discrete position transmitters. Systems and methods described herein provide a method of diagnosing the actuator and associated valve by monitoring the steady-state conditions of the overall process including the turbo-machinery unit, which allows for diagnosing of actuators not equipped with analog or discrete position transmitters.

According to implementations described herein, a partial stroke command may be generated only during steady-state conditions and feedback signals, such as process flow and pressure in addition to valve position feedback, are used to evaluate valve response. In one implementation, a valve controller confirms steady-state conditions for a turbo-compressor system that includes a control valve in a first position and sends, to an actuator for the control valve, a signal to initiate a partial valve stroke of the control valve to move away from the first position. The valve controller receives feedback signals from sensors in the turbo-compressor system and monitors the feedback signals for a change from the steady-state conditions. When the monitoring detects a change from the steady-state conditions within a pre-defined time period, the valve controller sends, to the actuator, a signal to return the control valve to the first position. When the monitoring does not detect a change from the steady-state conditions within the pre-defined time period, the valve controller generates an alarm signal.

FIG. 1 is a schematic of a turbo-compressor system 10 in which systems and methods described herein may be implemented. As shown in FIG. 1, system 10 includes a compressor 100 with an anti-surge valve 110 connected to an actuator 115. A valve position for anti-surge valve 110 may be set by controller 150 by sending a signal to actuator 115.

Process feedback for compressor 100 may be collected from multiple sensors, including suction pressure sensor 120, a discharge pressure sensor 130, and a flow meter 140. A suction pressure transmitter 125 collects data from suction pressure sensor 120. A discharge pressure transmitter 135 collects data from discharge pressure sensor 130. A flow transmitter 145 collects data from flow meter 140. In one implementation, actuator 115 may provide a position feedback signal. Signals from actuator 115, suction pressure transmitter 125, discharge pressure transmitter 135, and flow transmitter 145 may be sent to a valve controller 150. Valve controller 150 may analyze signals from actuator 115, suction pressure transmitter 125, discharge pressure transmitter 135, and flow transmitter 145 and calculate a closed loop response to, for example, determine a position for anti-surge valve 110.

Under normal operating conditions for compressor 100, anti-surge valve 110 may remain in the same position (e.g., closed) for an extended period of time. Thus, according to implementations described herein, valve controller 150 may perform periodic or manually-initiated testing to confirm that anti-surge valve 110 and actuator 115 remain operational. As described further herein, valve controller 150 may confirm steady-state operations for system 10 before generating partial stroke commands for actuator 115. The partial stroke commands may signal minimal valve movement to minimize disruption of system 10, but should result in a change from the steady state if anti-surge valve 110 and actuator 115 are operating properly. If there is no change in steady-state conditions after a partial stroke command (e.g., as determined by feedback from actuator 115, suction pressure transmitter 125, discharge pressure transmitter 135, and flow transmitter 145), valve controller 150 may generate an alarm signal that anti-surge valve 110 and/or actuator 115 are not functioning properly.

FIGS. 2-5 are flow diagrams for a process 200 of testing valve cycling using system feedback, according to an implementation. Reference is made to the particular configuration of FIG. 1 for simplicity. However, the flow diagrams of FIGS. 2-5 may apply to other arrangements of valves or sensors within turbo-compressor system 10. For example, instead of anti-surge valve 110, descriptions herein may also apply to turbine valves and associated sensors.

Process 200 may include enabling a valve exercise (block 210) and determining if there are steady-state conditions (block 220). For example, valve controller 150 may receive user input, such as a start command, or be programmed for scheduled periodic testing of valve 110. As a pre-condition to performing the valve test, valve controller 150 may identify steady-state conditions for a relevant portion of system 10. In one implementation, multiple signals from suction pressure transmitter 125, discharge pressure transmitter 135, and flow transmitter 145 can be used in the steady-state determination. For example, valve controller 150 may calculate time filtered derivatives of each signal using a first-order filter. Using several filters with different time constants allows reliable detection of signal changes occurring at different rates. Thus, valve controller 150 can identify relatively fast changes as well as relatively slow changes in operating conditions of system 10. In one implementation, multiple first order time filters (e.g., up to five time filters) can be applied for filtering derivatives across the entire range of frequency interest. Identifying steady-state conditions is described further in connection with FIG. 3 below.

If steady-state conditions are detected (block 220—yes), process 200 may further include determining if a partial valve stroke should be initiated (block 230). For example, valve controller 150 may determine whether a periodic interval for testing has occurred or if a manual activation is detected. If a partial valve stroke should not be initiated (block 230—no), process 200 may return to block 220 to continue monitoring for steady state conditions.

If a partial valve stroke should be initiated (block 230—yes), it may be determined if there is a change to the steady-state conditions (block 240). For example, with stable conditions detected, valve controller 150 may send to actuator 115 a configurable partial-stroke signal to change the position of valve 110. The partial-stroke signal may constitute, for example, a ramp, step, or multi-step position change for anti-surge valve 110. Configurations for the partial-stroke signal may indicate a maximum allowable change in position, for example, that should disrupt steady-state conditions without significantly impacting or degrading system 10 performance. In conjunction with the partial-stroke signal, valve controller 150 may monitor feedback signals (e.g., from actuator 115, suction pressure transmitter 125, discharge pressure transmitter 135, and flow transmitter 145) to detect a change from steady-state conditions in system 10. Valve controller 150 may monitor feedback signals directly from actuator 115, suction pressure transmitter 125, discharge pressure transmitter 135, and flow transmitter 145, or valve controller 150 may monitor variables calculated based on one or more of the feedback signals.

If steady-state conditions are no longer detected (block 240—no), the test is successful and the valve may be reset to its previous position (block 250). For example, a change in steady-state conditions implies movement of valve 110, indicating that both valve 110 and actuator 115 successfully executed the partial-stroke instructions from valve controller 150. Upon detection of valve 110 movement, valve controller 150 may instruct actuator 115 to return valve 110 to the original steady-state position.

If steady-state conditions are still detected (block 240—yes), an alarm is generated to indicate no valve movement (block 260). For example, if a preset diagnostic time window ends without valve controller 150 detecting a change from steady-state conditions, it is presumed there is no movement of valve 110. Valve controller 150 may generate an alarm to indicate, for example, a problem with valve 110 and/or actuator 115.

Returning to block 220, if steady-state conditions are not detected after enabling the valve exercise (block 220—no), the valve exercise is not permitted (block 270). For example, if valve controller 150 monitors signals from suction pressure transmitter 125, discharge pressure transmitter 135, and flow transmitter 145 (e.g., for a configurable time period) without identifying stable conditions, valve controller 150 may not permit valve testing and may continue to monitor for steady state conditions.

Figure 2:
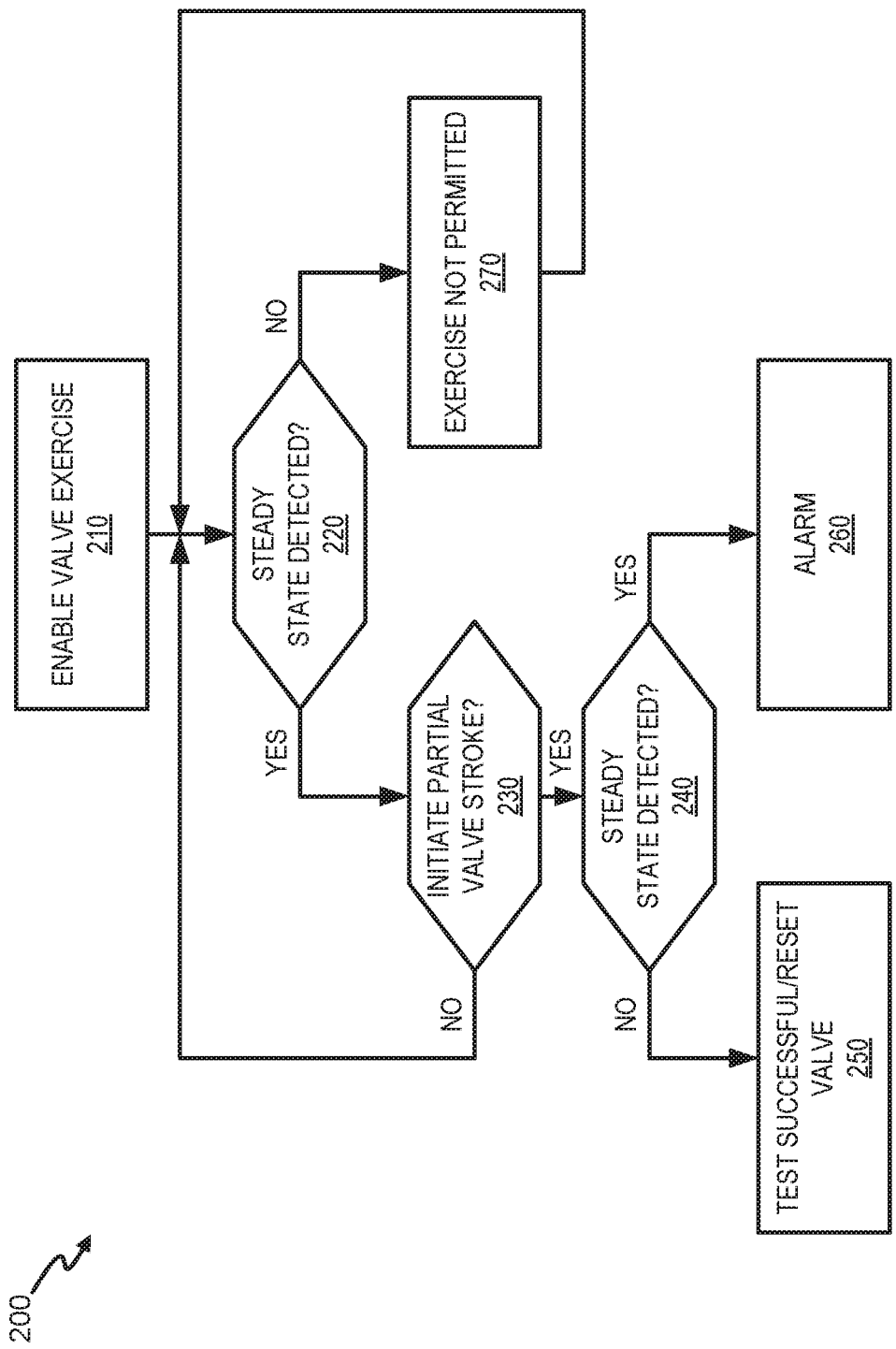
FIG. 2 is a process flow diagram for testing valve cycling using system feedback, according to an implementation described herein.
Figure 3:
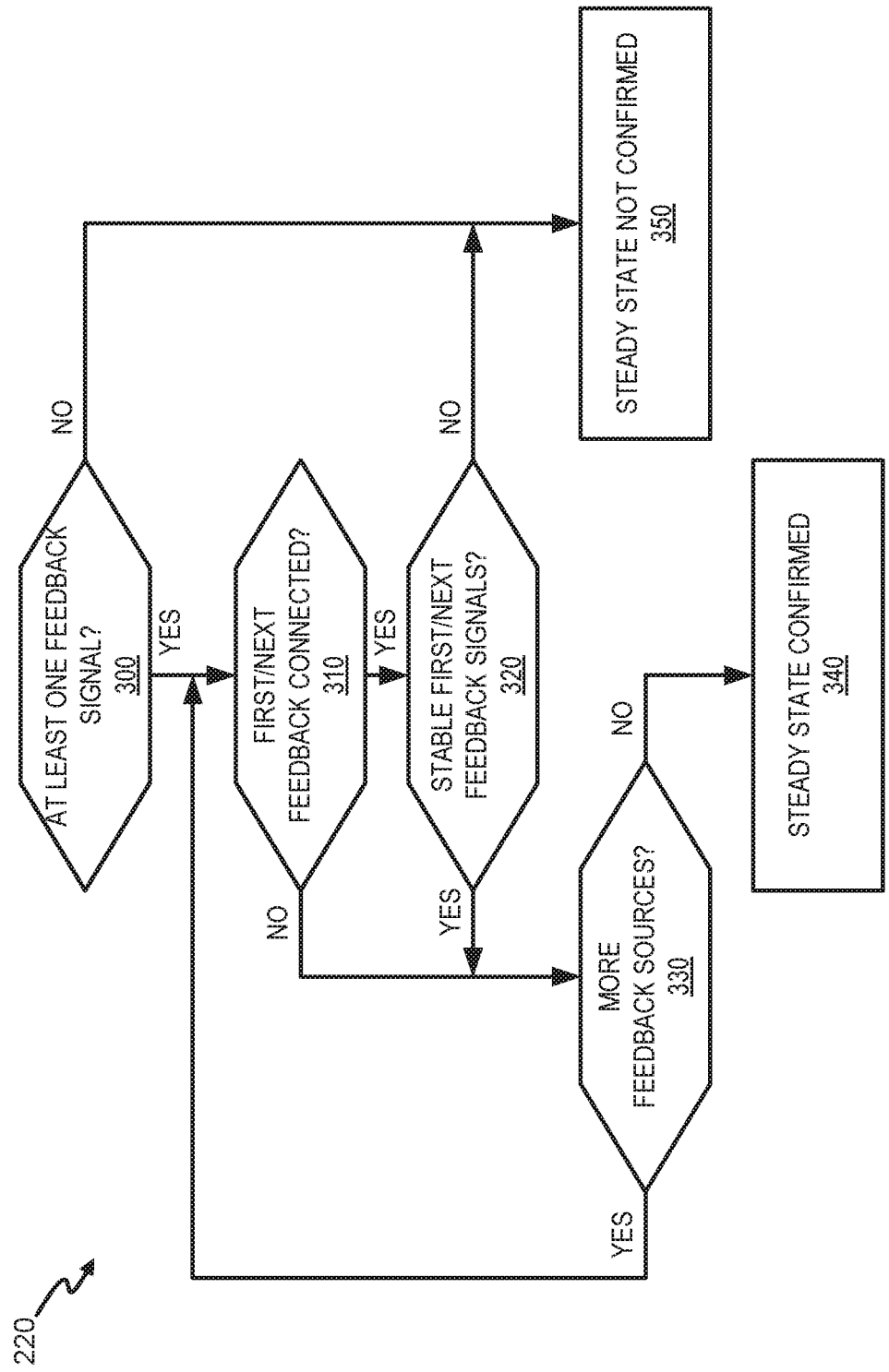
FIG. 3 is a process flow diagram for determining if there are pre-exercise steady-state conditions in the process flow of FIG. 2.

FIG. 3 is a flow diagram for determining if there are steady-state conditions in block 220 of FIG. 2, according to an implementation. For example, valve controller 150 may monitor multiple input signals to determine if there is steady-state condition in system 10 prior to initiating a valve cycling exercise. As shown in FIG. 3, valve controller 150 may determine if at least one feedback signal is being received (block 300). For example, valve controller 150 may identify if a connection with at least one of suction pressure transmitter 125, discharge pressure transmitter 135, or flow transmitter 145 is in place. If there are no connections (block 300—no), process block 220 may indicate steady state cannot be confirmed (block 350). If there is at least one feedback signal (block 300—yes), connections and valid signals for each feedback source may be confirmed (block 310). For example, valve controller 150 may determine if a feedback signal is being received from suction pressure transmitter 125, discharge pressure transmitter 135, or flow transmitter 145.

If a feedback source is connected (block 310—yes), it may be determined if the feedback signal from the feedback source is stable (block 320). For example, valve controller 150 may calculate multiple filtered derivatives of each feedback signal. As explained in above, for each signal, the derivative is calculated as the difference between the unfiltered and filtered values of the signal (termed filtered differentials), using first-order time filter. Using filters with different time constants allows for detecting fast or slow rates of change with the same sensitivity. Valve controller 150 may compare filtered differentials to a threshold value (e.g., a minimum amount of change required to indicate a disturbance) to determine if the values are stable.

If feedback signals from the feedback sources are stable (block 320—yes), it may be determined if more feedback sources require evaluation (block 330). For example, valve controller 150 may determine if signals from all relevant input sources (e.g., suction pressure transmitter 125, discharge pressure transmitter 135, flow transmitter 145, etc.) for identifying stable conditions have been evaluated.

If no more feedback sources require evaluation (block 330—no), steady-state conditions may be confirmed (block 340). For example, if valve controller 150 determines that all input signals from suction pressure transmitter 125, discharge pressure transmitter 135, or flow transmitter 145 during-measured time intervals are stable, valve controller 150 may confirm that steady-state conditions exist. If more feedback sources participating in evaluation (block 330—yes), process 220 may return to block 310 and be repeated for a next feedback source.

If a feedback signals from the feedback source is not stable (block 320—no), steady-state conditions cannot be confirmed (block 350). For example, when the feedback signals from a suction pressure transmitter 125, a discharge pressure transmitter 135, or a flow transmitter 145 are not stable, the valve controller 150 may indicate non-steady-state conditions. Thus, in one implementation, where there is a lack of data from one feedback source, process 220 may rely on one or more other connected feedback sources to detect steady-state conditions (e.g., instead of failing to confirm steady-state conditions due to limited data).

While the flow diagram in FIG. 3 is represented as a sequential series of blocks, in other implementations, blocks may be performed in parallel. For example, feedback signals from suction pressure transmitter 125, discharge pressure transmitter 135, or flow transmitter 145 may be evaluated simultaneously over each time filter interval.

Figure 4:
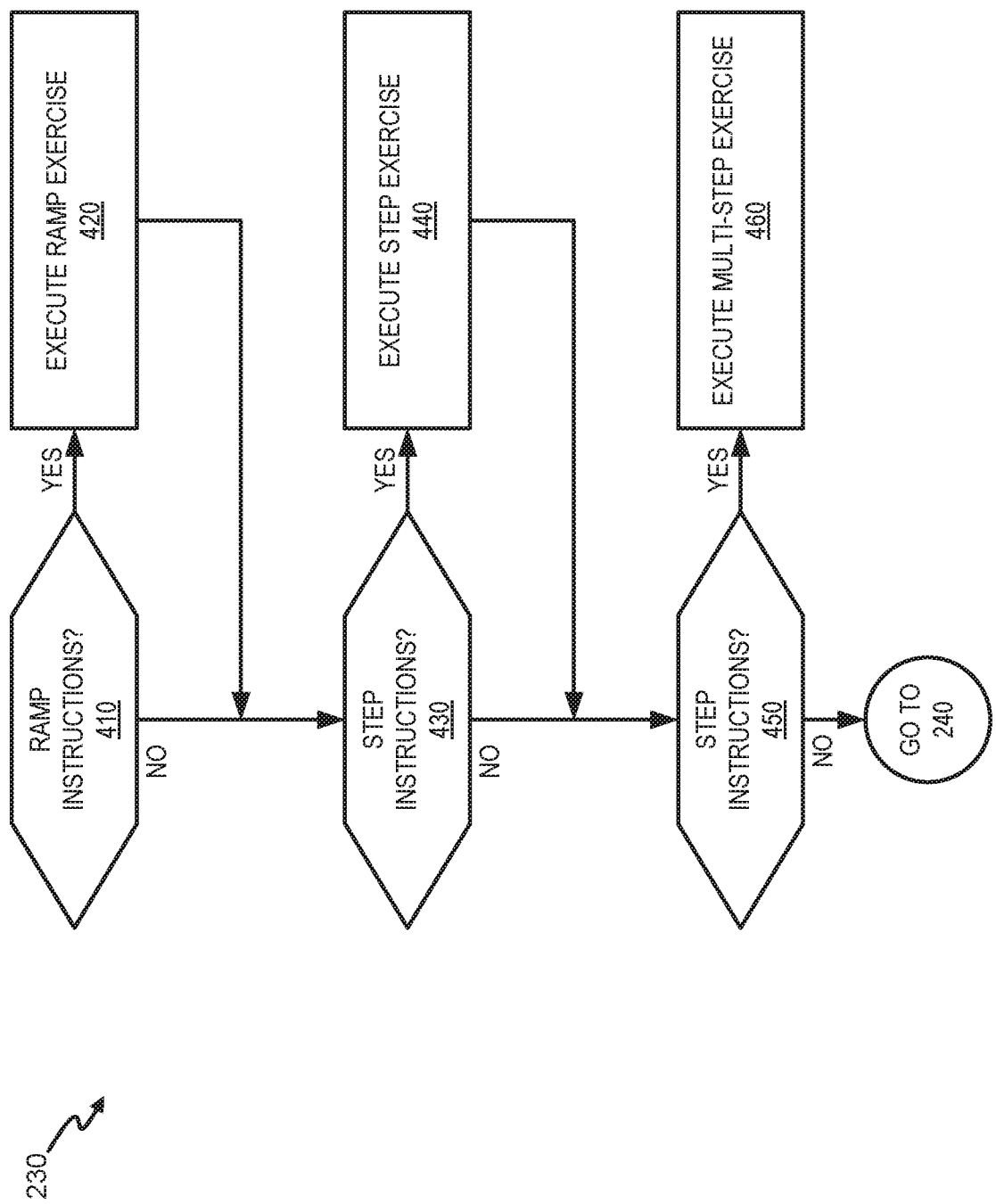
FIG. 4 is a process flow diagram for activating a partial valve stroke in the process flow of FIG. 2.

FIG. 4 is a flow diagram for activating a partial valve stroke in block 230 of FIG. 2, according to an implementation. For example, valve controller 150 may be provided with instructions for initiating one or more types of valve movement for testing valve 110 and actuator 115. As shown in FIG. 4, it may be determined if there are ramp instructions for valve testing (block 410). For example, valve controller 150 may be configured to initiate a partial valve stroke for a configured distance over a configured time interval (e.g., ramp rate). In one implementation, the configured valve movement distance may correspond to a maximum allowable distance that is configured to disrupt the steady-state conditions without disabling or negatively impacting the operation of system 10.

If there are ramp instructions for valve testing (block 410—yes), valve controller 150 may execute a ramp exercise for control valve 110 (block 420). For example, valve controller 150 may provide a signal to valve actuator 115 to move control valve 110 from the measured steady-state position toward a target position at a particular rate. If actuator 115 completes the partial stroke up to the target position, valve controller 150 may signal actuator 115 to return control valve 110 to an original steady-state position.

If there are no ramp instructions for valve testing (block 410—no) or after executing the ramp exercise (block 420), it may be determined if there are step instructions for valve testing (block 430). For example, valve controller 150 may be configured to initiate a partial valve stroke for a configured distance (e.g., step size). In one implementation, the configured step size may correspond to a maximum allowable valve movement that is configured to disrupt the steady-state conditions without disabling the system 10.

If there are step instructions for valve testing (block 430—yes), valve controller 150 may execute a step exercise for control valve 110 (block 440). For example, valve controller 150 may provide a signal to valve actuator 115 to move control valve 110 from the measured steady-state position to a target position. After actuator 115 completes the partial stroke of the configured step size, valve controller 150 may signal actuator 115 to return control valve 110 to the original steady-state position.

If there are no step instructions for valve testing (block 430—no) or after executing the step exercise (block 440), it may be determined if there are multi-step instructions for valve testing (block 450). For example, valve controller 150 may be configured to initiate a partial valve stroke of multiple steps in discrete timer periods toward a maximum valve movement distance.

If there are multi-step instructions for valve testing (block 450—yes), valve controller 150 may execute a multi-step exercise for control valve 110 (block 460). For example, valve controller 150 may provide a signal to valve actuator 115 to move control valve 110 from the measured steady-state position to a target position in a series of smaller increments. In one implementation, the configured step size for each of the multiple steps may be a portion of the maximum allowable valve movement that is configured to disrupt the steady-state conditions without disabling the system 10. For example, if the maximum allowable valve movement for the control valve exercise is a ten percent movement (e.g., from 100% open to 90% open or 100% closed to 90% closed), the multi-step step size may be two percent and the number of steps may be five. A time interval between each of the steps may be configured to permit for measurement of a feedback differential (e.g., from any one of suction pressure transmitter 125, discharge pressure transmitter 135, or flow transmitter 145).

Figure 5:
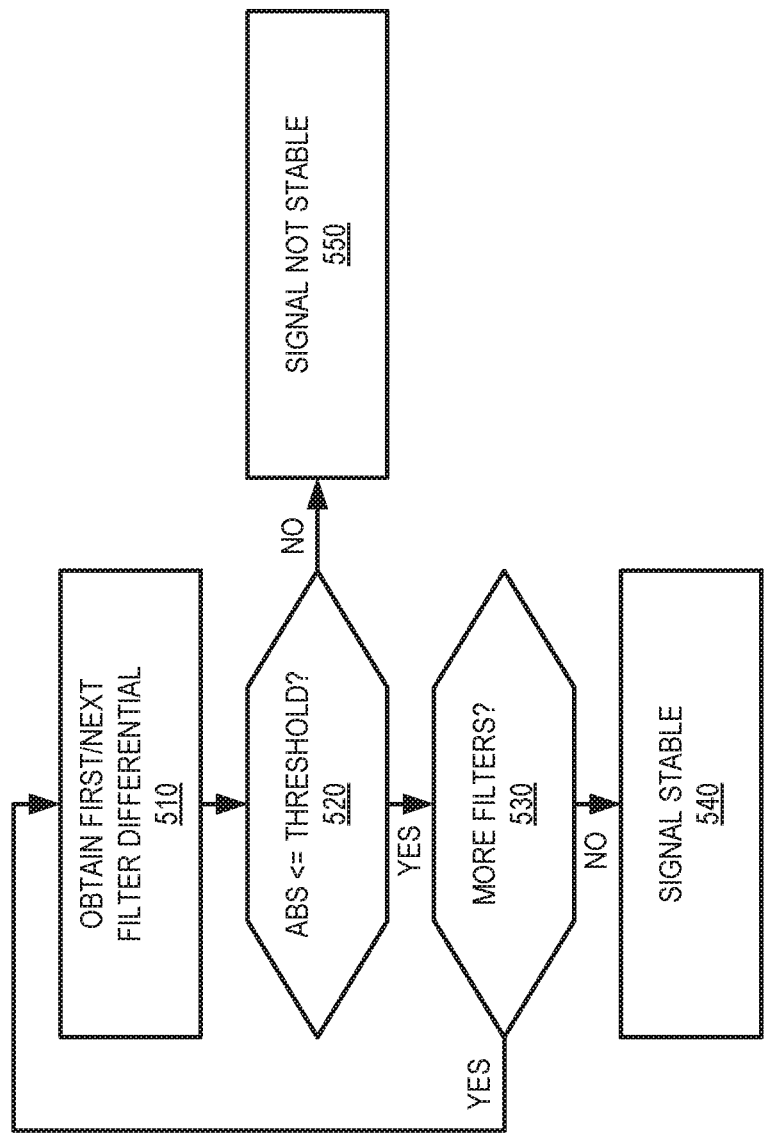
FIG. 5 is a process flow diagram for determining if feedback signals from a feedback source are stable in the process flows of FIG. 3.

Block 320 of FIG. 3 may include the blocks depicted in FIG. 5, according to an implementation. As shown in FIG. 5, block 320 may include obtaining a differential (block 510) and comparing an absolute value of the derivative to a threshold (block 520). For example, valve controller 150 may receive an input signal from one of suction pressure transmitter 125, discharge pressure transmitter 135, or flow transmitter 145. Valve controller 150 calculates a signal derivative a using a first-order filter. The absolute value of the derivative may be compared to a threshold value. The threshold value may indicate the maximum allowed variation from the steady-state condition (or, alternatively, the minimum amount of change required to indicate a disturbance). The threshold value may include, for example, a percentage change or a rate of change for a particular sensor reading (e.g., suction pressure, discharge pressure, or flow rate).

If the absolute value of the derivative is greater than the threshold (block 520—no), it may be determined that the signal is not stable (block 550). In one implementation, additional signals need not be calculated/compared after a first instance of a non-stable signal is identified.

If the absolute value of the differential is less than or equal to the threshold (block 520—yes), it may be determined if more filters are available for the signal (block 530). For example, valve controller 150 may determine that the absolute value of the filtered signal is less than the threshold change value and may determine if other time constants, of the set number of time constants configured for the process, have been applied to the feedback signal. Using filters with different time constants allows reliable measurement of signal changes occurring at different frequencies. Thus, fast changes as well as slow changes due to movement of control valve 110 can be identified. In one implementation, up to five time filters can be applied to measure derivatives across the entire range of the frequency spectrum of interest.

If more filters are available for the signal (block 530—yes), valve controller 150 may return to block 510 and proceed to apply a filter with a different time constant for the feedback signal. If no more filters are available to be applied, the signal may be considered stable (block 540). For example, if the absolute value of the derivative of a signal from suction pressure transmitter 125 is below the threshold value for all applicable time constants, the signal may be considered stable.

Figure 6:
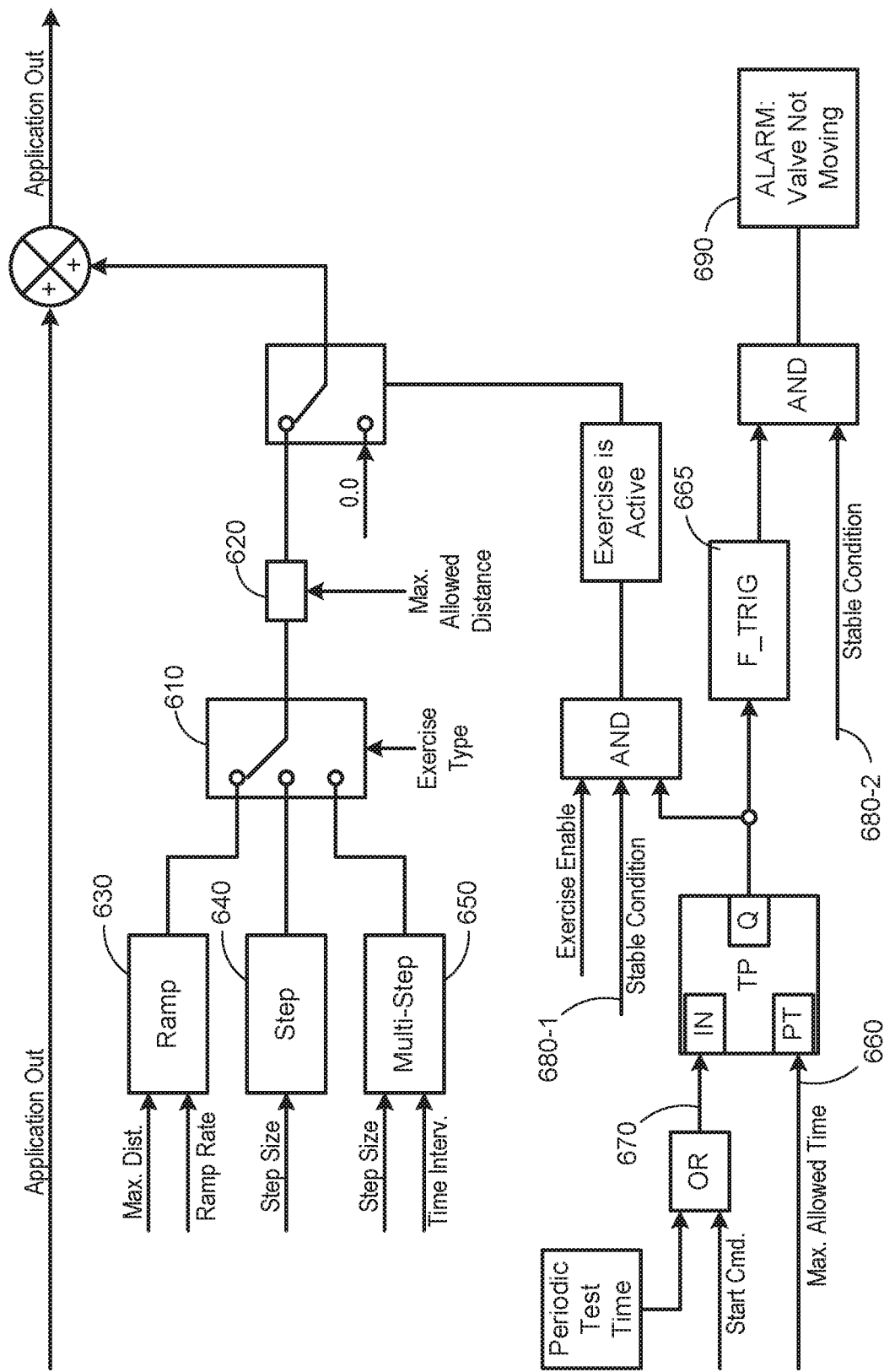
FIG. 6 is a diagram of a scheme for testing valve cycling using system feedback according to an implementation.

FIG. 6 is a diagram of a scheme for testing valve cycling using system feedback according to an implementation. In FIG. 6, user input may be provided to configure an exercise type 610—which may include one or more of a ramp, step, or multi-step exercise—and a maximum allowed distance 620 for valve movement (e.g., of control valve 110) during the exercise. User input may additionally include configuration settings for a ramp exercise 630, a step exercise 640, and/or a multi-step exercise 650, depending on the configuration settings for exercise type 610.

Configuration settings for ramp exercise 630 may include, for example, a target valve movement distance (e.g., "max. distance") and a ramp rate. The target valve movement distance may correspond to the maximum allowed distance 620 or a smaller distance. The ramp rate may include a time to achieve the target valve movement distance.

Configuration settings for step exercise 640 may include, for example, a step size for a valve position change. The step size may correspond to the maximum allowed distance 620 or a smaller distance.

Configuration settings for multi-step exercise 650 may include, for example, a step size for each of multiple valve position changes and a time interval between each step. The step size may correspond to a distance less than the maximum allowed distance 620, such as an increment of the maximum allowed distance 620. The time interval may identify a period of time between each step (e.g., to allow for detection of a state change). During a valve exercise, steps in multi-step exercise 650 may continue to be signaled in sequence up to the point where the valve position for control valve 110 reaches the maximum allowed distance 620 (e.g., if no change in steady-state is detected).

Still referring to FIG. 6, a configuration setting for a maximum allowed time 660 for completion of the valve exercise may be input. A start signal 670 may be received to initiate a valve exercise for valve controller 150. Start signal 670 may be generated, for example, automatically in response to a periodic testing cycle or based on a manual start command.

If the valve exercise is enabled (e.g., start signal 670 is received) and stable (e.g., steady-state) conditions 680-1 are detected, valve controller 150 may perform a valve exercise according to configuration settings 610-750. Detection of instability in system 10 (e.g., caused by control valve 110 movement) will be interpreted as proper valve function. If stable conditions 680-2 persist for the maximum allowed time 660 (e.g., at falling edge trigger 665) valve controller 150 may provide an alarm 690 indicating a test failure.

Figure 7:
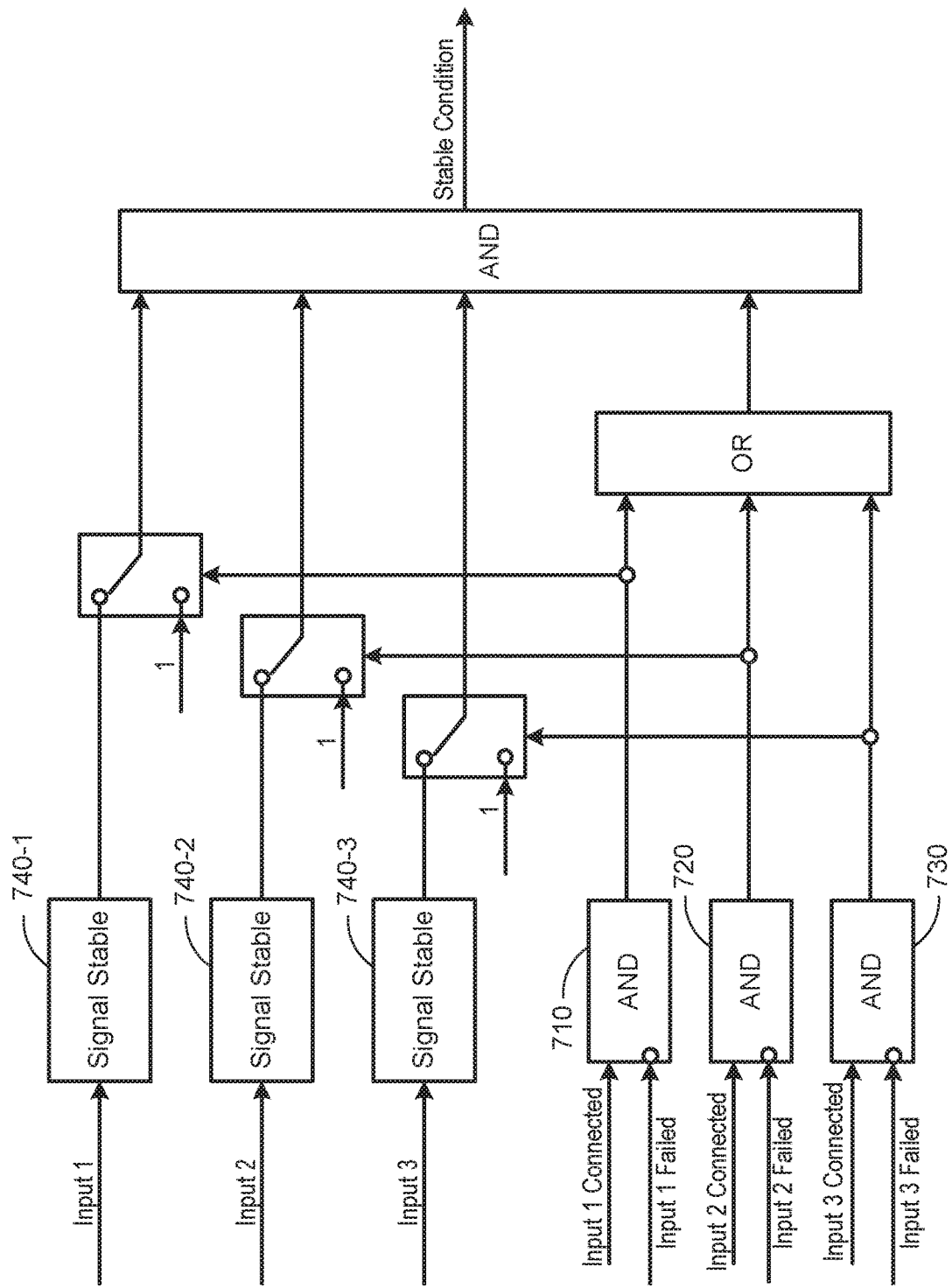
FIG. 7 is a diagram of a scheme for identifying a stable condition using system feedback, according to an implementation.

FIG. 7 is a diagram of a scheme for identifying a stable condition using system feedback, according to an implementation. The control scheme illustrated on FIG. 7 may be implemented by valve controller 150. Description of FIG. 7 may correspond, for example, to stable condition input 680-1/780-2 of FIG. 6. In FIG. 7 at 710, 720, and 730, valve controller 150 may verify that feedback sources (e.g., input 1, input 2, and input 3) are all connected and functioning. Input 1, input 2, and input 3 may correspond, for example, to suction pressure transmitter 125, discharge pressure transmitter 135, and flow transmitter 145. In other implementations, different feedback sources and/or different numbers of feedback sources may be used. For example, in another implementation, only one input signal may be used to identify a stable condition. In one implementation, if it is determined at 710, 720, or 730 that no signals are being received from one or more of input 1, input 2, or input 3, stable conditions may be determined using the remaining functional feedback connections. If no signals are being received from any of input 1, input 2, or input 3, stable conditions may not be determined.

Assuming signals are being received from input 1, input 2, and input 3, tests for signal stability form each of input 1, input 2, and input 3 may be conducted at 740-1, 740-2, and 740-3 (referred to collectively as "signal stable test 740"). Signal stable test 740 is described further in connection with FIG. 8 below. If each of input 1, input 2, and input 3 are connected and found to have stable signals, system 10 may be determined to be in a stable condition (e.g., as input 680-1/or 680-2 of FIG. 6).

Figure 8:
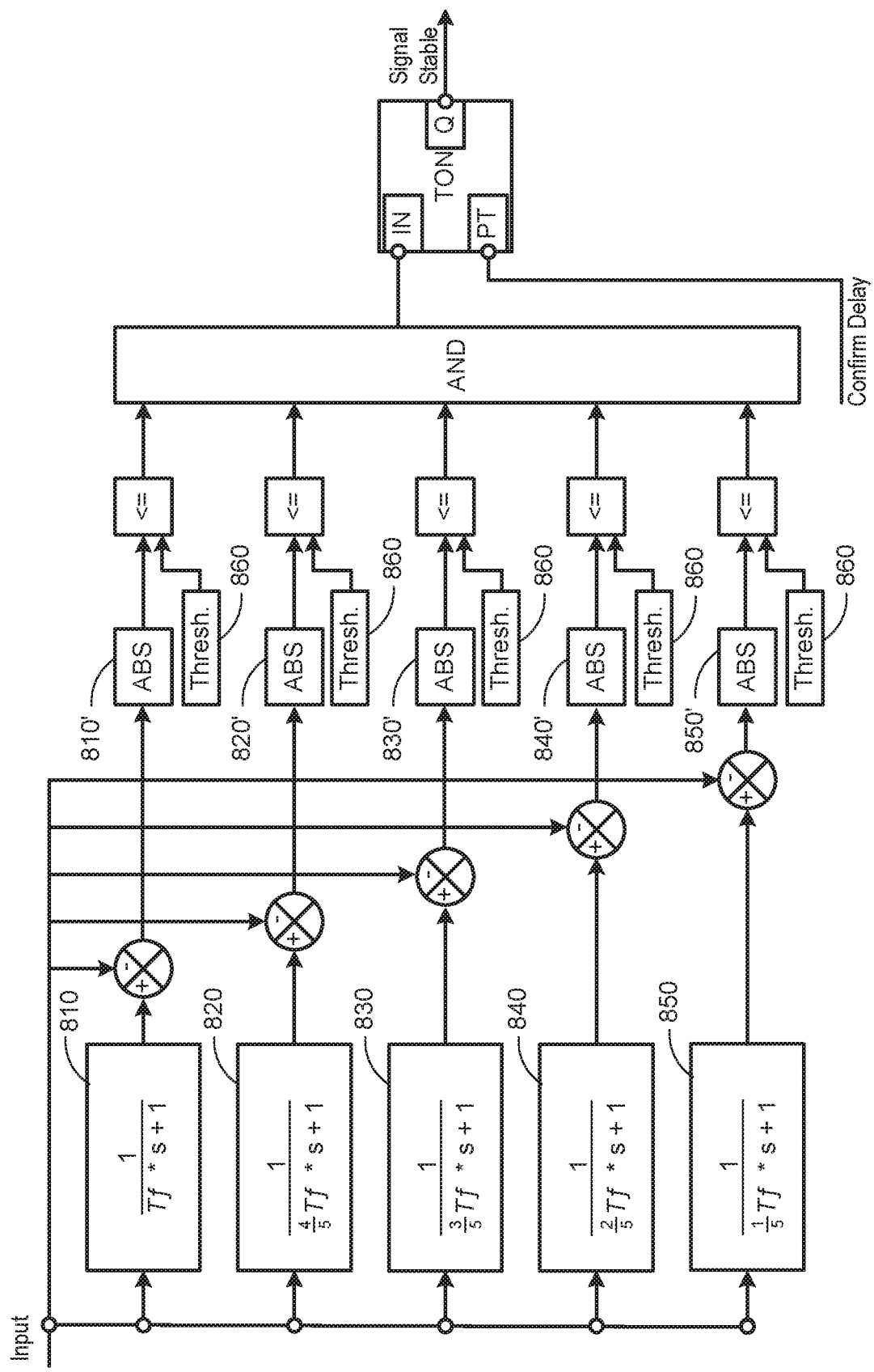
FIG. 8 is a diagram of a scheme for identifying a stable signal using system feedback, according to an implementation.

FIG. 8 is a diagram of a scheme for identifying a stable signal using system feedback, according to an implementation. The control scheme illustrated on FIG. 7 may be implemented by valve controller 150. Description of FIG. 8 may correspond, for example, to signal stable test 740 of FIG. 7. In FIG. 8, valve controller 150 may receive an input signal (e.g., one of input 1, input 2, or input 3) and calculate a derivative of the signal using a first-order filter 810. In one implementation, the first order filter is a continuous-time transfer function such as $1/(T_f*s+1)$, where Tf is a time constant and s is the operator of differentiating. The first order filter may be applied with different time constants in filters 820, 830, 840, and 850 to identify relatively fast changes as well as relatively slow changes in system 9. Using filters with different time constants allows reliable measurement of signal changes occurring at different frequencies. While five different filters are shown in FIG. 8, fewer or more filters may be used in other implementations. For example, three filters, two filters, or one filter may also be used.

As further shown in FIG. 8, an absolute value (ABS) 810', 820', 830', 840', and 850' of each filtered signal is compared with a threshold value 860. Threshold value 860 may represent a minimum amount of change required to indicate a disturbance from a steady-state condition. If all of values 810', 820', 830', 840', and 850' are less than or equal to the threshold value 860, the signal is considered stable. If any of values 810', 820', 830', 840', or 850' are greater than the threshold value 860, the signal is deemed unstable.

FIG. 9 is a diagram illustrating exemplary physical components of valve controller 150. Valve controller 150 may include a bus 910, a processor 920, a memory 930, an input component 940, an output component 950, and a communication interface 960.

Bus 910 may include a path that permits communication among the components of valve controller 150. Processor 920 may include a processor, a microprocessor, or processing logic that may interpret and execute instructions. Memory 930 may include any type of dynamic storage device that may store information and instructions (e.g., software 935), for execution by processor 920, and/or any type of non-volatile storage device that may store information for use by processor 920.

Software 935 includes an application or a program that provides a function and/or a process. Software 935 is also intended to include firmware, middleware, microcode, hardware description language (HDL), and/or other form of instruction.

Input component 940 may include a mechanism that permits a user to input information to valve controller 150, such as a keyboard, a keypad, a button, a switch, a touch screen, etc. Output component 950 may include a mechanism that outputs information to the user, such as a display, a speaker, one or more light emitting diodes (LEDs), etc.

Communication interface 960 may include a transceiver that enables valve controller 150 to communicate with other devices and/or systems via wireless communications, wired communications, or a combination of wireless and wired communications. For example, communication interface 960 may include mechanisms for communicating with another device or system, such as suction pressure transmitter 125, discharge pressure transmitter 135, and flow transmitter 145, via a network, or to other devices/systems, such as a system control computer that monitors operation of multiple systems 9 (e.g., in a steam plant or another type of plant). In one implementation, communication interface 960 may be a logical component that includes input and output ports, input and output systems, and/or other input and output components that facilitate the transmission of data to/from other devices.

Valve controller 150 may perform certain operations in response to processor 920 executing software instructions (e.g., software 935) contained in a computer-readable medium, such as memory 930. A computer-readable medium may be defined as a non-transitory memory device. A non-transitory memory device may include memory space within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Valve controller 150 may include fewer components, additional components, different components, and/or differently arranged components than those illustrated in FIG. 9. As an example, in some implementations, a display may not be included in valve controller 150. In these situations, valve controller 150 may be a "headless" device that does not include input component 940. As another example, valve controller 150 may include one or more switch fabrics instead of, or in addition to, bus 910. Additionally, or alternatively, one or more components of valve controller 150 may perform one or more tasks described as being performed by one or more other components of valve controller 150.

Systems and methods described herein relate to a method of diagnosing a control valve and actuator by monitoring the steady-state conditions of the overall system including the turbo-machinery unit, which allows for diagnosing of actuators, even if not equipped with analog or discrete position transmitters. During the diagnostic test, the automatic control system sends a configurable signal (ramp, jump step, or sequence of jump steps) which should move the actuator. The diagnostic test continues until movement is either detected or the preset diagnostic time window has ended. When movement is detected (e.g., stable condition is no longer satisfied), the diagnostic test ends and the actuator returns the valve to its desired control position. If the preset diagnostic time window ends with a stable condition still present, this means the valve did not move and an alarm signal is generated. The systems and methods described herein thus decrease the amount of, and time required for, the valve disturbance and increases the reliability of the associated valve exercise. In contrast, existing diagnostics require bigger and longer disturbances, which usually decrease the reliability and may result in production losses.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method of conducting a diagnostic test for a control valve, the method comprising:
confirming, by a control system, steady-state conditions for a turbo-compressor system that includes the control valve in a first position;
sending, by the control system and to an actuator for the control valve, a signal to initiate a partial valve stroke to move the control valve away from the first position;
receiving, by the control system and after sending the signal to initiate the partial valve stroke, feedback signals from sensors in the turbo-compressor system;
monitoring, by the control system, the feedback signals for a change from the steady-state conditions, wherein the monitoring comprises:
identifying a set number of different time intervals to apply, calculating a derivative of each of the feedback signals using a first-order filter over the different time intervals, and comparing each of the derivatives to a corresponding steady-state threshold;

sending, by the control system and to the actuator, a signal to return the control valve to the first position in response to the monitoring detecting a change from the steady-state conditions; and generating, by the control system, an alarm signal in response to the monitoring not detecting a change from the steady-state conditions.

2. The method of claim 1, wherein confirming the steady-state conditions includes receiving multiple feedback signals from different sources.

3. The method of claim 2, wherein the multiple feedback signals include signals from one or more pressure sensors or one or more flow sensors, or variables calculated based on one or more of the multiple feedback signals.

4. The method of claim 3, wherein the multiple feedback signals further include a valve position signal.

5. The method of claim 1, wherein sending the signal to initiate the partial valve stroke includes sending instructions for a ramped valve movement, the instructions including a target valve movement distance and ramp rate.

6. The method of claim 1, wherein sending the signal to initiate the partial valve stroke includes sending instructions for a step valve movement, the instructions including a step size for the valve movement that is less than a full valve stroke.

7. The method of claim 1, wherein sending the signal to initiate the partial valve stroke includes sending instructions for a multi-step valve movement, the instructions including a step size, a number of steps, and a time interval between steps.

8. The method of claim 1, wherein sending the signal to initiate the partial valve stroke includes sending instructions for one or more of a ramped valve movement or a step valve movement.

9. The method of claim 1, wherein monitoring the feedback signals for the change from the steady-state conditions further comprises:

determining, prior to the comparing, an absolute value of each of the derivatives.

10. The method of claim 1, wherein the different time intervals include two, three, or five different time intervals.

11. The method of claim 1, wherein the signal to initiate the partial valve stroke to move the control valve away from the first position includes a second position with a maximum allowed distance that is configured to disrupt the steady-state conditions without disabling the turbo-compressor system.

12. The method of claim 1, further comprising:

receiving, by the control system, a signal to initiate the diagnostic test, wherein the signal to initiate the diagnostic test is one of a manual start command or a periodic test command.

13. A valve control system, comprising:

a memory device for storing instructions; and a processor configured to execute the instructions to:

confirm steady-state conditions for a turbo-compressor system that includes a control valve in a first position;

send, to an actuator for the control valve, a signal to initiate a partial valve stroke to move the control valve away from the first position;

receive, after sending the signal to initiate the partial valve stroke, feedback signals from sensors in the turbo-compressor system;

monitor the feedback signals for a change from the steady-state conditions, wherein the monitoring comprises:

identifying a set number of different time intervals to apply, calculating a derivative of each of the feedback signals using a first-order filter over the different time intervals, and comparing each of the derivatives to a corresponding steady-state threshold;

send, to the actuator, a signal to return the control valve to the first position in response to the monitoring detecting a change from the steady-state conditions; and generate an alarm signal in response to the monitoring not detecting a change from the steady-state conditions.

14. The valve control system of claim 13, wherein, when comparing the derivatives, the processor is further configured to:

determine an absolute value of each of the derivatives.

15. The valve control system of claim 14, wherein the different time intervals include two, three, or five different time intervals.

16. The valve control system of claim 13, wherein the steady-state threshold represents a minimum amount of change required to indicate a disturbance from the steady-state conditions.

17. The valve control system of claim 13, wherein, when confirming steady-state conditions, the processor is further configured to:

monitor the feedback signals for one or more of suction pressure, discharge pressure, or flow rate.

18. The valve control system of claim 13, wherein the feedback signals include feedback signals from at least one sensor.

19. A non-transitory computer-readable medium containing instructions executable by at least one processor, the computer-readable medium comprising one or more instructions to:

confirm steady-state conditions for a turbo-compressor system that includes a control valve in a first position;

send, to an actuator for the control valve, a signal to initiate a partial valve stroke to move the control valve away from the first position;

receive, after sending the signal to initiate the partial valve stroke, feedback signals from sensors in the turbo-compressor system;

monitor the feedback signals for a change from the steady-state conditions, wherein the monitoring comprises:

identifying a set number of different time intervals to apply, calculating a derivative of each of the feedback signals using a first-order filter over the different time intervals, and comparing each of the derivatives to a corresponding steady-state threshold;

send, to the actuator, a signal to return the control valve to the first position in response to the monitoring detecting a change from the steady-state conditions; and generate an alarm signal in response to the monitoring not detecting a change from the steady-state conditions.

20. The non-transitory computer-readable medium claim 19, further comprising one or more instructions to:
  receive a signal to initiate a diagnostic exercise, wherein confirming the steady-state conditions is performed in response to receiving the signal to initiate the diagnostic exercise.

* * * * *